Dec. 7, 1926.
G. M. SCHROEDTER
1,609,577
BLANKET
Filed May 29, 1926
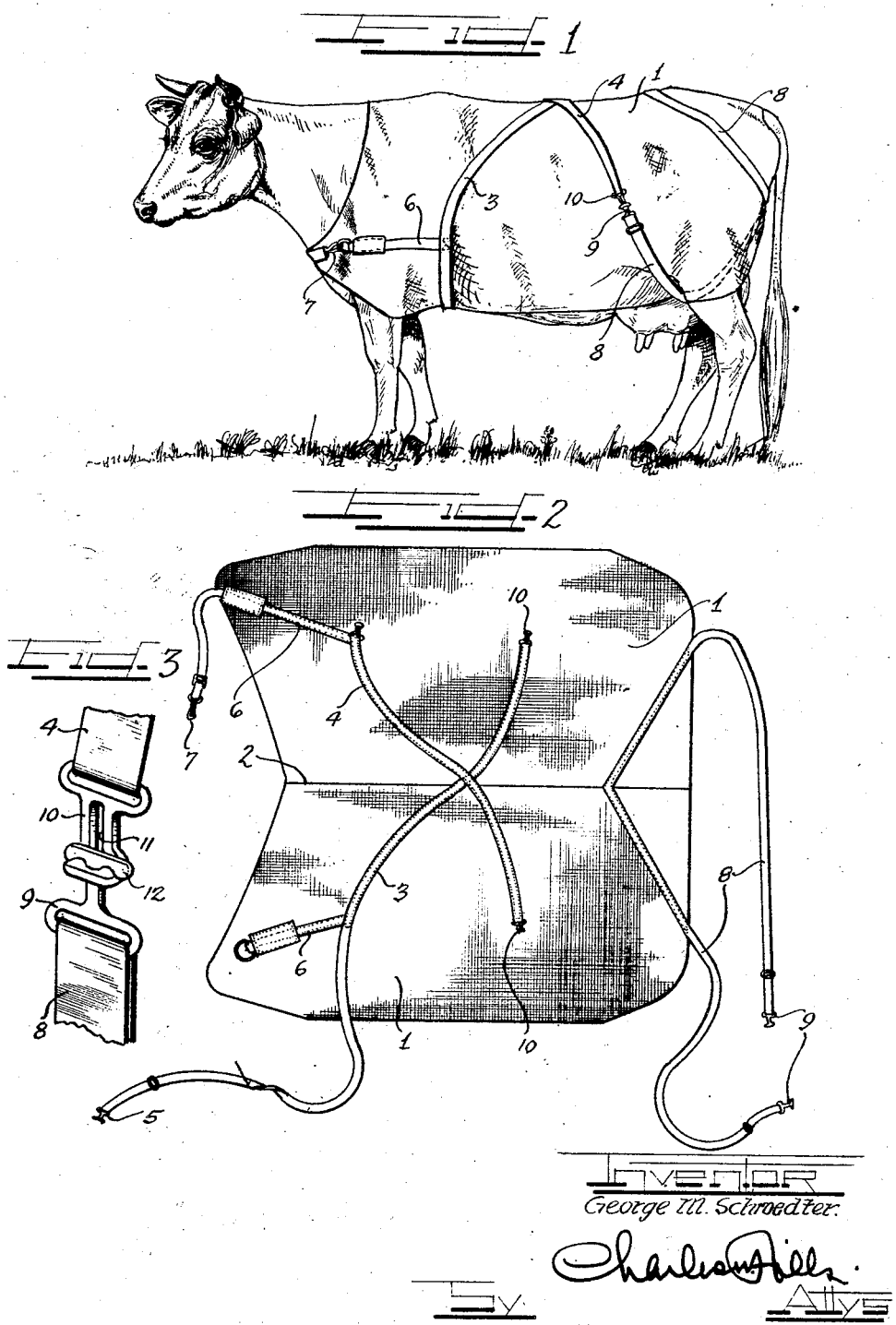
Inventor
George M. Schroedter
By Charles Hill
Attys Patented Dec. 7, 1926.

1,609,577

UNITED STATES PATENT OFFICE.

GEORGE M. SCHROEDTER, OF CHICAGO, ILLINOIS, ASSIGNOR TO WILLIAM COOPER & NEPHEWS, A CORPORATION OF ILLINOIS.

BLANKET.

Application filed May 29, 1926. Serial No. 112,475.

This invention relates to blankets adapted to be placed on animals, cows more particularly.

Various devices of this character have been proposed, more or less difficult to apply and adjust and apt to be in the way in milking.

It is an object, therefore, of the present invention to provide a blanket, simple in construction, easy to apply and adapted, when used on a cow, to be out of the way in milking.

Other and further important objects of this invention will be apparent from the disclosures in the accompanying drawings and the following specification.

The invention (in a preferred form) is illustrated on the drawings and hereinafter more fully described.

On the drawings:

Figure 1 shows a cow with a blanket constructed in accordance with the present invention.

Figure 2 is a plan view of the blanket.

Figure 3 is a detail view showing one of the buckles.

As shown on the drawings:

The blanket as shown comprises two pieces of material 1, united by a seam 2 adapted to extend along the back of the animal. At its forward end the blanket is cut away to fit the neck and shoulders of the animal.

Stitched or otherwise secured to the blanket are two crossed straps 3 and 4. One of these straps, as 3, is extended so that it may be passed around under the belly of the animal and secured by suitable fastening means 5 to the corresponding end of the strap 4.

Other straps 6 extend longitudinally along each side of the blanket and are provided with suitable fastening means 7 so that these straps may be connected across the animal's chest.

From the center seam, two straps 8 extend obliquely outwardly and rearwardly to the rear margin of the blanket. When the blanket has been laid on the animal the free ends of these straps are passed forwardly between the legs and up over the rear margins of the blanket and then secured by fastening devices 9 to cooperating fastening devices 10 on the ends of straps 3 and 4.

The construction of the fastening devices 9 and 10 is shown more particularly in Figure 3. The part 10 is formed with a slot 11 through which a cross-bar 12 on the part 9 may be inserted.

By arranging the straps 3 and 4 so that they pass diagonally across the animal's back, a much more flexible arrangement is provided than where a strap passing perpendicularly around the body of the animal is provided.

Further, by arranging that the rear straps pass over the side margins of the blanket, the latter are drawn inwardly so as to be out of the way during milking.

I am aware that many changes may be made, and numerous details of construction may be varied through a wide range without departing from the principles of this invention, and I therefore do not purpose limiting the scope of the claim of the patent granted hereon, otherwise than necessitated by the prior art.

I claim as my invention:

An animal blanket having a pair of crossed straps secured thereto adapted when in use to extend from the middle of the back of the animal downwardly and forwardly and around under the belly of the animal near its forelegs, and further straps adapted when in use to extend from the middle of the animal downwardly and rearwardly to the rear margin of the blanket around the legs and up over the side margin, and means for releasably attaching the free ends of said further straps to the rear ends of said crossed straps.

In testimony whereof I have hereunto subscribed my name.

GEORGE M. SCHROEDTER.